United States Patent
Ogura et al.

(10) Patent No.: US 11,519,758 B2
(45) Date of Patent: Dec. 6, 2022

(54) SYSTEM FOR IDENTIFYING REMOVAL OF MAINTENANCE HATCH AND METHOD OF USING

(71) Applicant: NEC Corporation, Tokyo (JP)

(72) Inventors: Naoto Ogura, Tokyo (JP); Yukihide Yoda, Tokyo (JP); Koyo Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 16/818,184

(22) Filed: Mar. 13, 2020

(65) Prior Publication Data
US 2021/0285798 A1    Sep. 16, 2021

(51) Int. Cl.
*G01D 5/26* (2006.01)
*G08B 21/18* (2006.01)
*G01K 13/12* (2006.01)

(52) U.S. Cl.
CPC ............. *G01D 5/268* (2013.01); *G08B 21/18* (2013.01); *G01K 13/12* (2013.01)

(58) Field of Classification Search
None
See application file for complete search history.

(56) References Cited

U.S. PATENT DOCUMENTS

| | | |
|---|---|---|
| 2006/0071770 A1 | 4/2006 | Giotto et al. |
| 2006/0273246 A1* | 12/2006 | Browning ............ G08B 13/124 |
| | | 250/227.14 |
| 2008/0210852 A1 | 9/2008 | Browning et al. |
| 2011/0186203 A1 | 8/2011 | Lindner et al. |

FOREIGN PATENT DOCUMENTS

| | | | |
|---|---|---|---|
| CN | 109243123 A * | 1/2019 | ......... E02D 29/1481 |
| EP | 3474462 A1 | 4/2019 | |
| JP | 2006214844 A | 8/2006 | |
| WO | 2013/124761 A2 | 8/2013 | |
| WO | 2014/184178 A1 | 11/2014 | |
| WO | 2019189192 A1 | 10/2019 | |
| WO | 2020044660 A1 | 3/2020 | |

OTHER PUBLICATIONS

International Search Report in PCT Application No. PCT/JP2021/009513, dated Jun. 1, 2021, 11pp.

* cited by examiner

*Primary Examiner* — Chad H Smith
(74) *Attorney, Agent, or Firm* — Hauptman Ham, LLP

(57) ABSTRACT

A method of detecting removal of a maintenance hatch includes transmitting an optical pulse along an optical fiber, wherein a first portion of the optical fiber is proximate to the maintenance hatch. The method further includes detecting backscatter light from the optical fiber using a sensor. The method further includes determining information related to the first portion of the optical fiber based on a comparison of the detected backscatter light and a trained model. The method further includes identifying whether the maintenance hatch has been removed based on the determined information.

14 Claims, 8 Drawing Sheets

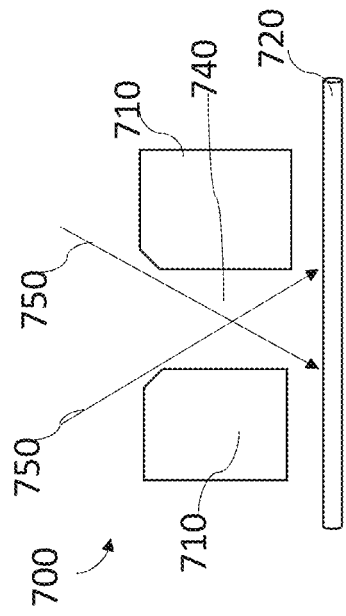
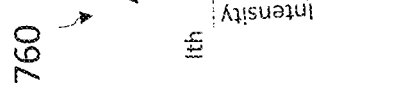
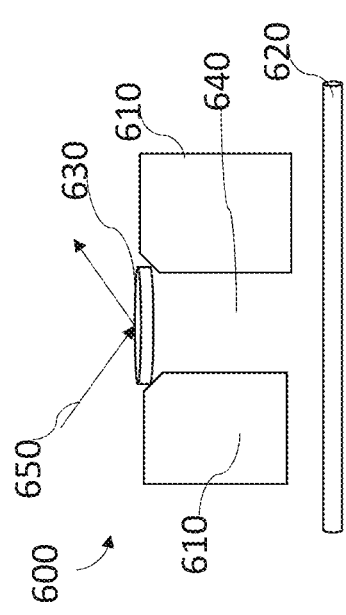
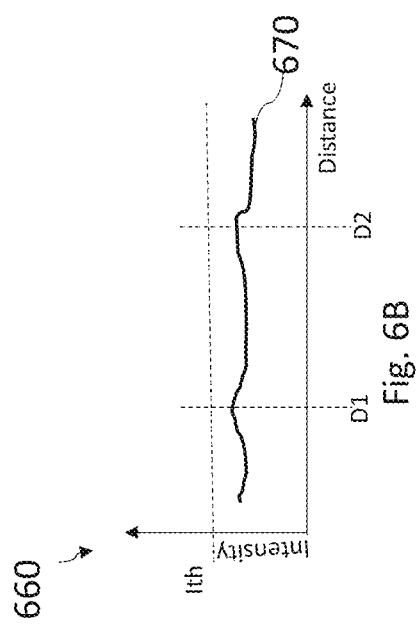

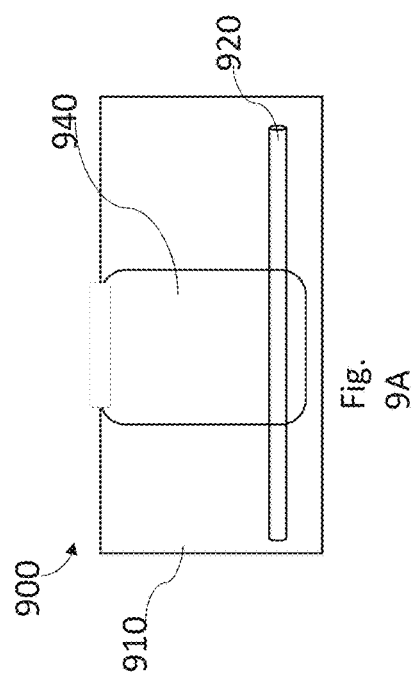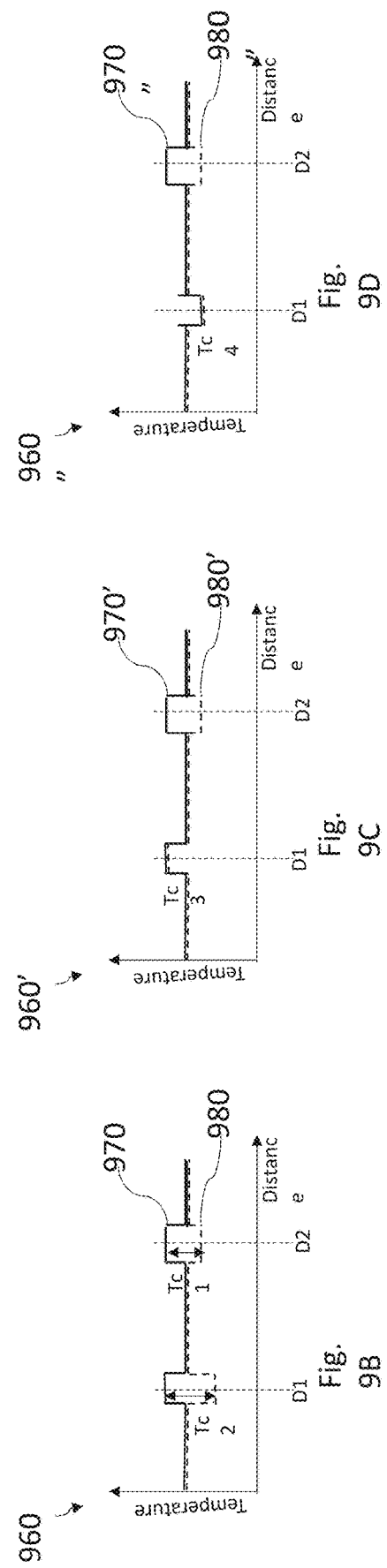

SYSTEM FOR IDENTIFYING REMOVAL OF MAINTENANCE HATCH AND METHOD OF USING

BACKGROUND

Due to a rising price of metal around the world, theft of maintenance hatches, such as manhole covers, is increasing. Thefts remove the maintenance hatches and sell the maintenance hatches for the metal. Some approaches rely on public reports to determine whether a maintenance hatch was removed. Some approaches rely on routine inspections to determine whether a maintenance hatch was removed. Detection of openings exposed by the removed maintenance hatches is often difficult and time consuming.

The removal of maintenance hatches increases a risk of damage to utilities covered by the maintenance hatches. Identifying thieves of the maintenance hatches based on public reporting or routine inspections has a low likelihood of success, which increases a risk of future theft of maintenance hatches.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6A is a view of an arrangement of a maintenance hatch covering an opening over optical fiber in accordance with some embodiments.

FIG. 6B is a graph of intensity versus distance resulting from the arrangement of FIG. 6A in accordance with some embodiments.

FIG. 7A is a view of an arrangement of an opening over optical fiber without a maintenance cover in accordance with some embodiments.

FIG. 7B is a graph of intensity versus distance resulting from the arrangement of FIG. 7A in accordance with some embodiments.

FIG. 9A is a view of an arrangement of a buried optical fiber including an opening without a maintenance hatch in accordance with some embodiments.

FIG. 9B is a graph of temperature versus distance resulting from the arrangement in FIG. 9A in accordance with some embodiments.

FIG. 9C is a graph of temperature versus distance resulting from the arrangement in FIG. 9A in accordance with some embodiments.

FIG. 9D is a graph of temperature versus distance resulting from the arrangement in FIG. 9A in accordance with some embodiments.

DETAILED DESCRIPTION

Figure 1:
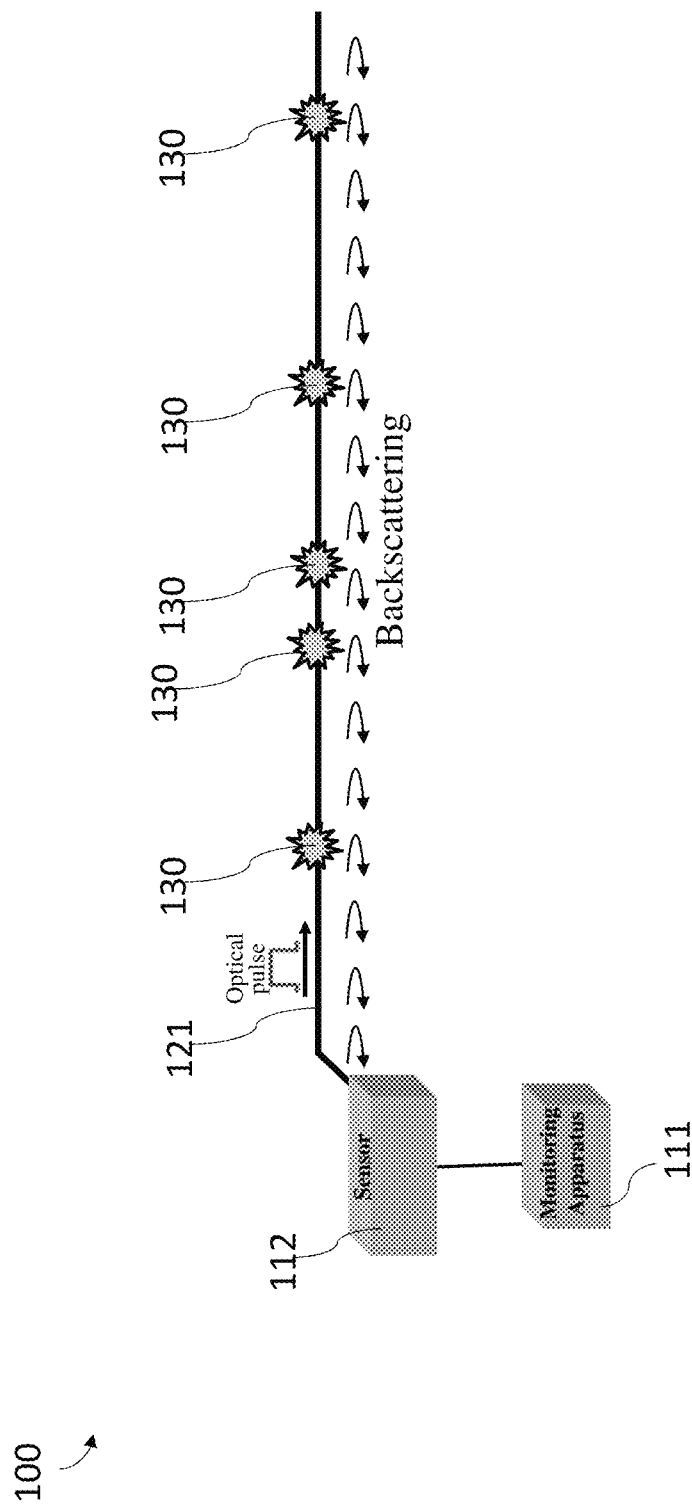
FIG. 1 is a schematic view of a sensor system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Identifying when a maintenance hatch, such as a manhole cover, is removed helps with prompt replacement of the maintenance hatch to reduce the risk of utilities covered by the maintenance hatch. Prompt identification of removal of a maintenance hatch also helps increase the odds of identify whether the maintenance hatch was stolen and if so, then by whom.

The current disclosure provides a system for identifying whether a maintenance hatch has been removed based on measurement of backscatter light data from an optical fiber. The optical fibers are used for communication between different facilities and are often already present in locations near maintenance hatches. As a result, the cost for monitoring removal of maintenance hatches is significantly reduced.

Utilizing optical fibers proximate maintenance hatches as a tool for identifying removal of maintenance hatches provides an accurate and precise determination of when and where a maintenance hatch is removed. For rural areas, public reporting is unlikely to identify a missing maintenance hatch in a timely manner due to a lower number of people traveling near the maintenance hatch. As a result, a risk of damage to underlying utilities increases. Routine inspections in rural areas is also time consuming and expensive because of the longer travel distances to conduct such an inspection. Using the systems and method described in the current disclosure helps to provide a low-cost and accurate determination of removal of maintenance hatches without requiring visual inspection of the maintenance hatch.

FIG. 1 is a schematic view of a sensor system 100 in accordance with some embodiments. Sensor system 100 includes a monitoring apparatus 111 in communication with a sensor 112. In some embodiments, the sensor 112 includes an optical time domain reflectometer (OTDR) or another suitable sensor. Sensor system 100 further includes an optical fiber 121 connected to the sensor 112. The sensor 112 receives backscatter light from the optical fiber 121, which is photo-electrically converted into a signal called backscatter light data for use in subsequent analysis. Optical fiber 121 is usable for carried information between communication facilities. Optical fiber 121 is positioned near maintenance hatches 130. An optical pulse is transmitted along the optical fiber 121. Backscatter light occurs as the optical pulse propagates along the optical fiber 121. The sensor 112 is configured to detect the backscatter light and transmit a signal based on the detected backscatter light to the monitoring apparatus 111.

In some embodiments, the maintenance hatches 130 are in sidewalks. In some embodiments, the maintenance hatches 130 are in roadways. In some embodiments, the maintenance hatches 130 are in the ground. In some embodiments, the optical fiber 121 is covered by the maintenance hatches 130. In some embodiments, the optical fiber 121 is offset from the maintenance hatches 130, but is sufficiently close to the maintenance hatch 130 to be impacted by a vibration associated with removing the maintenance hatches 130.

The backscatter light from the optical fiber 121 is impacted by an environment around the optical fiber 121. For example, vibrations in the ground impact the backscatter light generated by the optical pulse. Vibrations occur due to pedestrians walking near the optical fiber 121, vehicles passing near the optical fiber 121, as well as removal of a maintenance hatch near the optical fiber 121. Acoustic waves incident on the optical fiber 121 also impact the backscatter light generated during propagation of the optical pulse. Temperature of the optical fiber 121 also impacts the backscatter light. By detecting the backscatter light and applying a trained analysis model, the monitoring apparatus 111 is able to detect abnormalities in an environment surrounding the optical fiber 121.

The use of optical pulse will assist the backscatter light analysis to determine at what point along the optical fiber 121 the abnormality occurred. Based on the speed of the optical pulse traveling along the optical fiber and the timing of the detected backscatter light, a distance that the optical pulse traveled prior to the backscatter of the light is able to be determined. This helps the monitoring apparatus 111 determine both the location of the abnormality and the timing of the abnormality.

Figure 2:
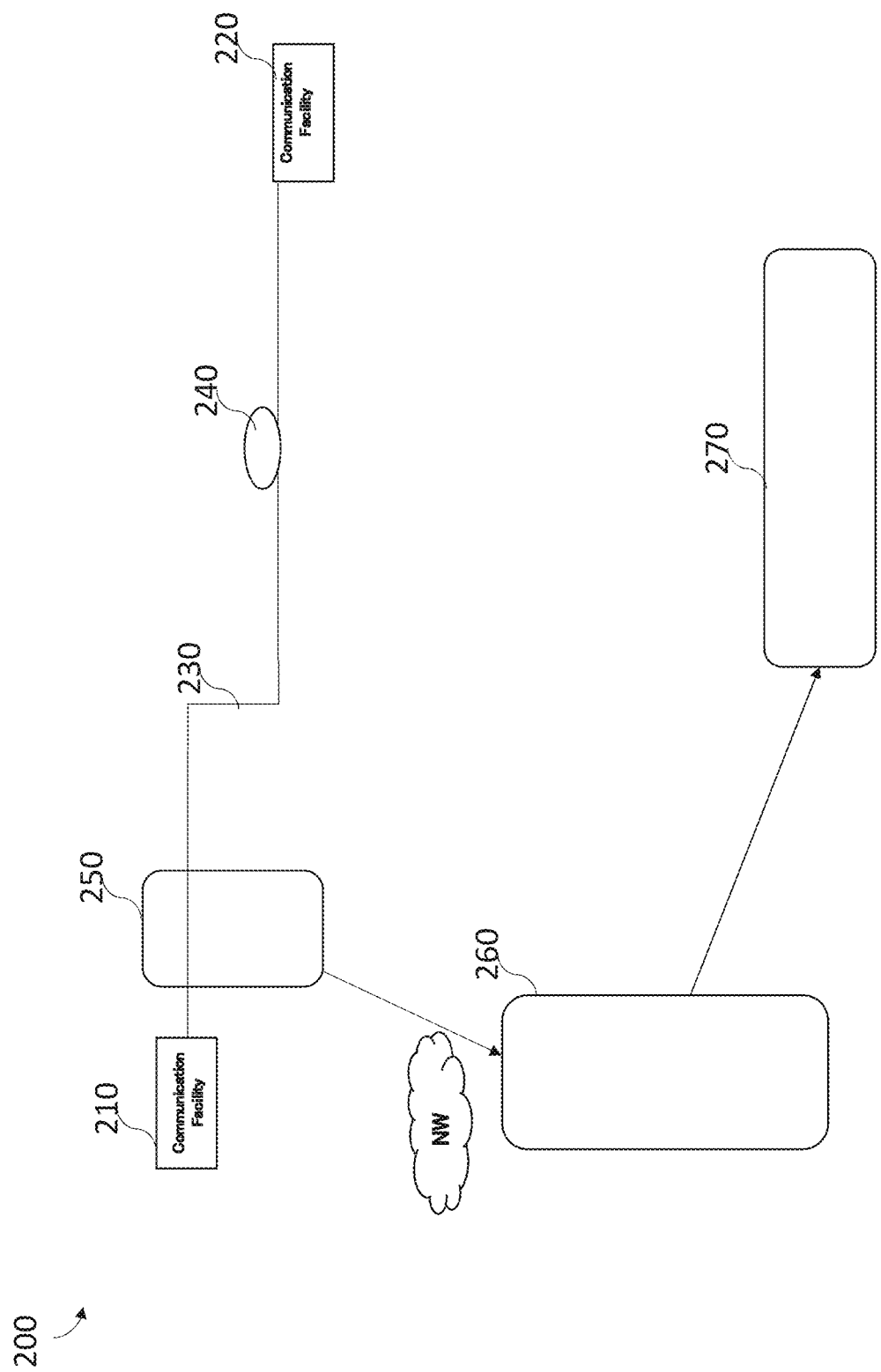
FIG. 2 is a schematic view of a system for monitoring removal of a maintenance hatch in accordance with some embodiments.

FIG. 2 is a schematic view of a system 200 for monitoring removal of a maintenance hatch in accordance with some embodiments. System 200 includes a first communication facility 210 and a second communication facility 220. An optical fiber 230 connects the first communication facility 210 with the second communication facility 220. A maintenance hatch 240 is located proximate the optical fiber 230. In some embodiments, the optical fiber 230 is covered by the maintenance hatch 240. In some embodiments, the optical fiber 230 is offset from the maintenance hatch 240. A sensor 250 is connected to the optical fiber 230. The sensor 250 is configured to receive backscatter light data from the optical fiber 230. A data analysis device 260 is in communication with the sensor 250. A surveillance device 270 is in communication with the data analysis device 260.

The optical fiber 230 is configured to carry information signals between the first communication facility 210 and the second communication facility 220. In some embodiments, the optical fiber 230 is a multi-mode optical fiber. In some embodiments, the optical fiber 230 is a single mode optical fiber. In some embodiments, the optical fiber 230 is at least partially buried in the ground. In some embodiments, the optical fiber 230 is within a conduit. In some embodiments, the optical fiber 230 is within a sewer or other utility passage.

The maintenance hatch 240 is covers an access point to utilities. In some embodiments, the maintenance hatch 240 includes a manhole cover. In some embodiments, the maintenance hatch 240 includes a grate, a cleanout cover, a drain cover or another suitable cover for a utility. The maintenance hatch 240 is sufficiently close to the optical fiber 230 so that removal of the maintenance hatch 240 will impact an ambient environment around the optical fiber 230. In some embodiments, the ambient environment around the optical fiber 230 is impacted by a vibration created by removing the maintenance cover 240. In some embodiments, the ambient environment around the optical fiber 230 is impacted by changing an ability of sound waves to be incident on the optical fiber 230. In some embodiments, the ambient environment around the optical fiber 230 is impacted by permitting higher magnitude temperature fluctuations at the optical fiber 230. In some embodiments, the ambient environment around the optical fiber 230 is impacted by allowing moisture to contact the optical fiber 230. FIG. 2 includes a single maintenance hatch 240 for the sake of simplicity. In some embodiments, the system includes multiple maintenance hatches 240.

The sensor 250 is configured to receive backscatter light data from optical fiber 230, including backscatter light data related to changes in the ambient environment around the optical fiber related to the presence or absence of maintenance hatch 240. The sensor 250 is configured to detect backscatter light data for light propagating from the first communication facility 210 to the second communication facility 220. In some embodiments, the sensor is configured to detect backscatter light data for light propagating from the second communication facility 220 to the first communication facility 210. In some embodiments, system 200 includes a second sensor (not shown) configured to receive backscatter light data for light propagating from the second communication facility 220 to the first communication facility 210. In some embodiments, sensor 250 includes an OTDR or another suitable sensor. In some embodiments, the sensor 250 is housed within the first communication facility 210. In some embodiments, the sensor 250 is separate from the first communication facility 210. In some embodiments, the sensor 250 is housed within the second communication facility 220. In some embodiments, sensor 250 is similar to sensor 112 (FIG. 1).

The data analysis device 260 is configured to receive backscatter light data from the sensor 250. The data analysis device 260 includes at least a processor for executing the functionality of the data analysis device 260. The data analysis device 260 is configured to analyze the backscatter light data to determine whether the backscatter light data indicates any abnormalities. The data analysis device 260 is in communication with the sensor 250 by a wireless network. In some embodiments, a wired connection exists between the data analysis device 260 and the sensor 250. In some embodiments that include multiple sensors, the data analysis device 260 is configured to receive backscatter light data from all of the sensors. In some embodiments that include multiple sensors, the data analysis device 260 is configured to receive backscatter light data from less than all of the sensors. In some embodiments, the data analysis device 260 is similar to monitoring apparatus 111 (FIG. 1).

The data analysis device 260 uses a trained model for analyzing the backscatter light data. In some embodiments, the trained model is provided to the data analysis device 260 by an external device. In some embodiments, the trained model is developed by the data analysis device 260.

The trained model is developed using teaching data. The teaching data includes information for normal and abnormal states of the backscatter light data. The normal state includes sample backscatter light data indicative of conditions of the optical fiber 230 when the maintenance hatch 240 is properly position. The abnormal state includes sample backscatter light data indicative of conditions of the optical fiber 230 when the maintenance hatch 240 is removed. In some embodiments, the conditions of the optical fiber 230 are related to at least one of vibrations of the optical fiber 230, sound waves incident on the optical fiber 230 or temperature fluctuations of the optical fiber 230. In some embodiments, the teaching data includes predicted or computer-generated data. In some embodiments, the teaching data includes empirical data. In some embodiments, the teaching data includes a combination of predicted or computer-generated data and empirical data.

The data analysis device 260 compares actual data received from the sensor 250 with the trained model to determine whether conditions of the optical fiber 230 are normal or abnormal. In some embodiments, the data analysis device 260 is configured to receive weather data from an external device to assist in determining an abnormal condition of the optical fiber 230. In some embodiments, the results of the comparison are transferred to the surveillance device 270.

The surveillance device 270 is configured to receive the results of the analysis by the data analysis device 260 and to provide the results to a user. The surveillance device 270 includes at least a display and a processor. In some embodiments, the surveillance device 270 is in wireless communication with the data analysis device 260. In some embodiments, the surveillance device 270 has a wired connection to the data analysis device 260.

The surveillance device 270 displays an alert in response to the analysis from the data analysis device 260 indicating abnormal conditions of the optical fiber 230. In some embodiments, the alert includes text, audio or graphical data. In some embodiments, the alert includes information related to a location of the abnormal condition of the optical fiber 230. In some embodiments, the alert includes a timing of a beginning of the abnormal conditions for the optical fiber 230. In some embodiments, the surveillance device 270 displays a normal status in response to the analysis from the data analysis device 260 indicating normal conditions of the optical fiber 230.

In some embodiments, the surveillance device 270 is connected to at least one local imaging device for capturing an image of an area including the maintenance hatch 240. In some embodiments, the surveillance device 270 displays an image from the local imaging device associated with the maintenance hatch 240 in response to receiving data indicating an abnormal condition of the optical fiber 230 at a location of the maintenance hatch 240. In some embodiments, the surveillance device 270 selects an image received from the local imaging device based on a determined timing of a beginning of the abnormal condition of the optical fiber 230 for display to the user.

In some embodiments, surveillance device 270 is omitted. In some embodiments, the results of the comparison are sent to a user in response to a determination of abnormal conditions of the optical fiber 230. In some embodiments, the alert is sent to a mobile device accessible by the user. In some embodiments, the alert includes text, audio or graphical data.

The ability to precisely and promptly detect a timing and location of an abnormal state of the optical fiber 230 permits system 200 to quickly determine whether the maintenance hatch 240 has been removed. This facilitates rapid replacement of the maintenance hatch 240 to reduce the risk of damage to utilities. In addition, combining a detected abnormal condition of the optical fiber 230 with imaging of the maintenance hatch 240 increases an ability to identify theft of the maintenance hatch 240, which can lead to capturing of the thief and deterring of future theft. Combining the detected abnormal condition of the optical fiber 230 with the imaging of the maintenance hatch 240 also helps to identify false positives in the abnormal detection data. These false positives are able to be fed back into the trained model used by the data analysis device 260 in order to improve the accuracy of the trained model. Even in some embodiments that do not include the surveillance device 270, if inspection of the maintenance hatch 240 following an indication of an abnormal condition of the optical fiber 230 indicates the maintenance hatch 240 remains in place the information is able to be fed back into the trained model.

In some embodiments, the data analysis device 260 or the surveillance device 270 is able to cross-reference scheduled maintenance with detected abnormal conditions of the optical fiber 230. By cross-referencing scheduled maintenance with the detected abnormal conditions of the optical fiber 230, unnecessary alerts to the user regarding removal of the maintenance hatch 240 are reduced or avoided.

Figure 3:
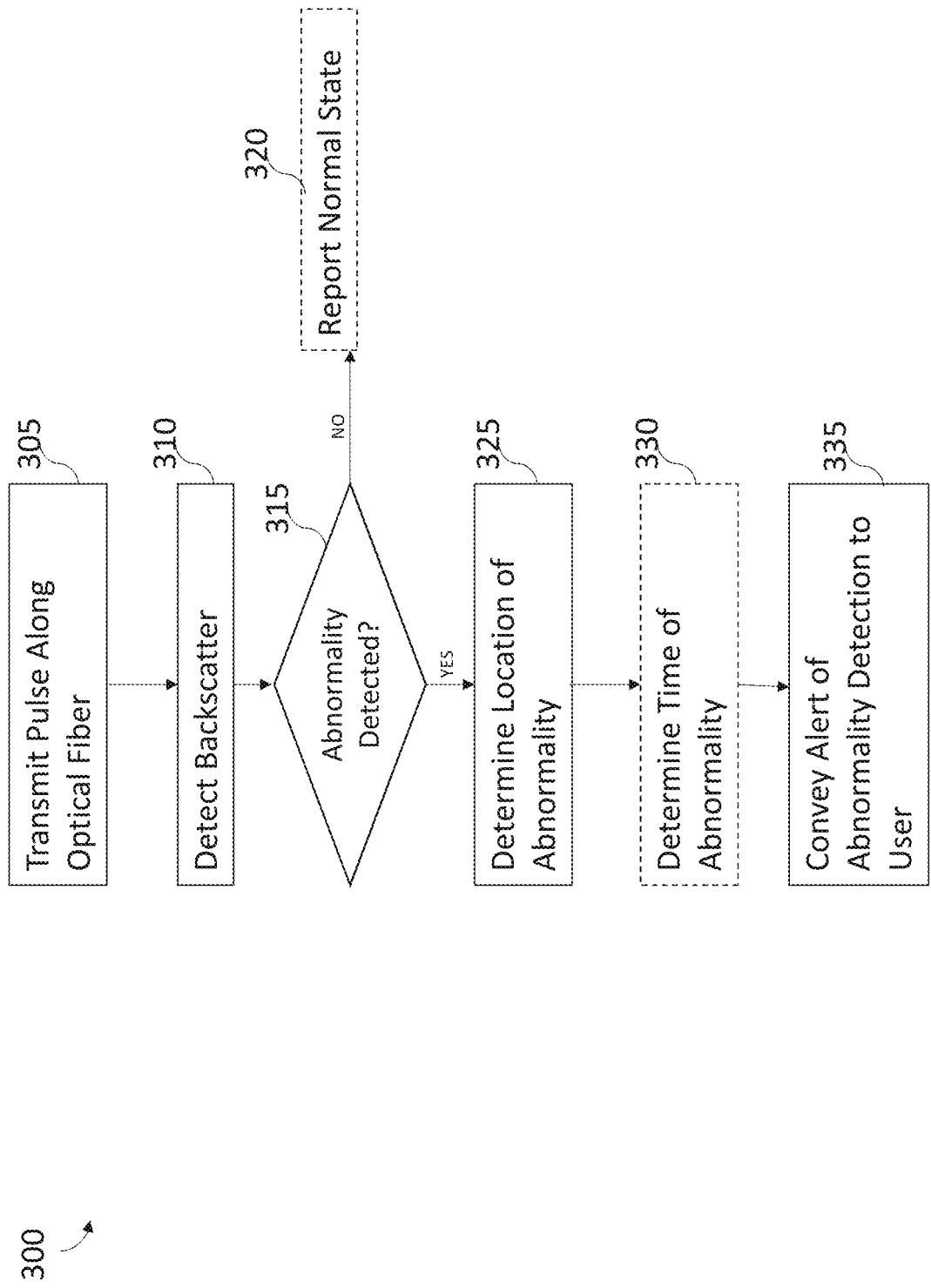
FIG. 3 is a flow chart of a method of identifying removal of a maintenance hatch in accordance with some embodiments.

FIG. 3 is a flow chart of a method 300 of identifying removal of a maintenance hatch in accordance with some embodiments. In operation 305, an optical pulse is transmitted along an optical fiber, e.g., optical fiber 121 (FIG. 1) or optical fiber 230 (FIG. 2). In some embodiments, the optical fiber comprises a multimode optical fiber. In some embodiments, the optical fiber comprises a single mode optical fiber. In some embodiments, the optical fiber is covered by the maintenance hatch. In some embodiments, the optical fiber is offset from the maintenance hatch. A proximity of the optical fiber to the maintenance hatch is sufficient that removal of the maintenance hatch will impact an ambient environment around a portion of the optical fiber.

In operation 310, backscatter light data is detected from the optical fiber. The backscatter light data is a result of reflections, e.g., Rayleigh reflections, within the optical fiber. As conditions around the optical fiber change, differences in the backscatter light data is detectable. In some embodiments, the backscatter light data is detected using an OTDR. In some embodiments, the backscatter light data is detected using sensor 112 (FIG. 1) or sensor 250 (FIG. 2).

In operation 315, the backscatter light data is analyzed to determine whether an abnormal condition exists around the optical fiber. In some embodiments, the abnormal condition is detectable due to at least one of vibrations of the optical fiber, sound waves incident on the optical fiber or temperature fluctuations of the optical fiber. The backscatter light data is analyzed using a comparison between the backscatter light data and a trained model. In some embodiments, the backscatter light data is analyzed using monitoring apparatus 111 (FIG. 1). In some embodiments, the backscatter light data is analyzed using data analysis device 260 (FIG. 2).

In response to a determination that no abnormal condition is detected, in some embodiments, method 300 proceeds to optional operation 320. In optional operation 320 a normal state is reported to the user. In some embodiments, the normal state is reported to the user by a surveillance terminal, e.g., surveillance device 270. In some embodiments, the normal state is reported to the user using a mobile device accessible by the user. In some embodiments, the normal state is reported using text, audio or graphical information.

In some embodiments, optional operation 320 is omitted. Optional operation 320 is omitted in situations where a user is primarily concerned with identifying removal of maintenance hatches. If optional operation 320 is omitted, then a normal state is not reported to the user.

In response to a determination that an abnormal condition is detected, method 300 proceeds to operation 325. In operation 325, a location of the abnormal condition along the optical fiber is determined. The location of the abnormal condition along the optical fiber is based on timing of the detected backscatter light data with respect to a corresponding transmitted pulse from operation 305. By determining the location of the abnormal condition, a location of the maintenance hatch that is a likely source for the abnormal condition is identified. The location of the abnormal condition is determined using a processor. In some embodiments, the location of the abnormal condition is determined by monitoring apparatus 111 (FIG. 1). In some embodiments, the location of the abnormal condition is determined by sensor 260 (FIG. 2). By detecting the location of the abnormal condition, the maintenance hatch is able to be quickly replaced to reduce the risk of damage to underlying utilities.

In optional operation 330, a timing of a beginning of the abnormal condition along the optical fiber is determined. The timing of the beginning of the abnormal condition along the optical fiber is based on when the detected backscatter light data is received. By determining the timing of the beginning of the abnormal condition, a time of the maintenance hatch being removed is identified. The timing of the beginning of the abnormal condition is determined using a processor. In some embodiments, the timing of the beginning of the abnormal condition is determined by monitoring apparatus 111 (FIG. 1). In some embodiments, the timing of the beginning of the abnormal condition is determined by sensor 260 (FIG. 2). By detecting the timing of the beginning of the abnormal condition, an opportunity to identify potential thieves increases.

In some embodiments, optional operation 330 is omitted. Optional operation 330 is omitted in situations where the nature of the abnormal condition causes a significant delay between beginning of the abnormal condition and detection of the abnormal condition. For example, if the abnormal condition is detected based on weather fluctuations, there could be a significant delay for detecting an abnormal condition because the detection would be based on a temperature difference (or expected temperature difference) that does not occur for multiple hours after the maintenance hatch is removed, in some instances. In another example, if the abnormal condition is detected based on sound waves incident on the optical fiber in a rural area the source of the sound waves is likely to pass the removed maintenance hatch a significant length of time after the maintenance hatch was initially removed. Omitting optional operation 330 helps to reduce processing load for an analysis where the timing of the beginning of the abnormal condition is unlikely to be useful information.

In operation 335, an alert of the abnormal condition is conveyed to a user. In some embodiments, the alert includes information about the location and/or timing of the abnormal condition. In some embodiments, the alert includes text, audio or graphical data. In some embodiments, the alert is combined with an image of an area including the maintenance hatch associated with the detected abnormal condition. In some embodiments, the alert is conveyed using surveillance device 270 (FIG. 2). In some embodiments, the alert is conveyed to a mobile device accessible by the user. In some embodiments, the alert is conveyed along with information related to scheduled maintenance associated with the maintenance hatch to reduce or avoid unnecessary concern over the removal of the maintenance hatch.

In some embodiments, additional operations are included in method 300. For example, in some embodiments, false positives are fed back to the trained model in order to improve accuracy of the trained model. In some embodiments, at least one operation is omitted. For example, in some embodiments, optional operation 330 is omitted as discussed above. In some embodiments, an order of operations in method 300 is modified. For example, in some embodiments, optional operation 320 is performed prior to operation 315 so that a normal state is reported until an abnormal state is detected.

Method 300 helps to increase the ability to precisely and promptly detect a timing and/or location of an abnormal state of the optical fiber. This facilitates rapid replacement of the maintenance hatch to reduce the risk of damage to utilities.

Figure 4:
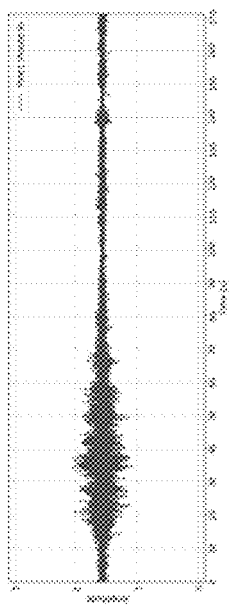
FIG. 4 is a graph of detected backscatter light data in accordance with some embodiments.

FIG. 4 is a graph 400 of detected backscatter light data in accordance with some embodiments. Graph 400 includes an amplitude of at a specific detected frequency over time for backscatter light data from an optical fiber. Graph 400 includes an increased amplitude of the detected frequency at a time range of about 15 seconds to about 60 seconds in comparison with other portions of the graph 400. This type of data is usable, for example, to determine the occurrence of vibrations in the ambient environment surrounding the optical fiber.

Figure 5C:
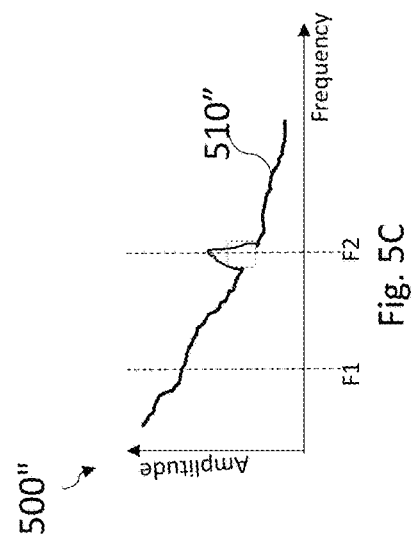
FIG. 5C is a graph of frequency versus amplitude based on detected backscatter light data in accordance with some embodiments.
Figure 5B:
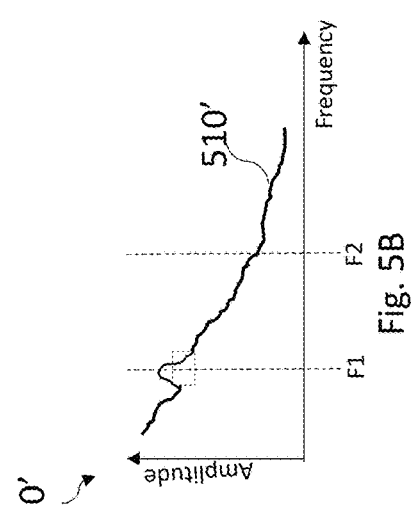
FIG. 5B is a graph of frequency versus amplitude based on detected backscatter light data in accordance with some embodiments.
Figure 5A:
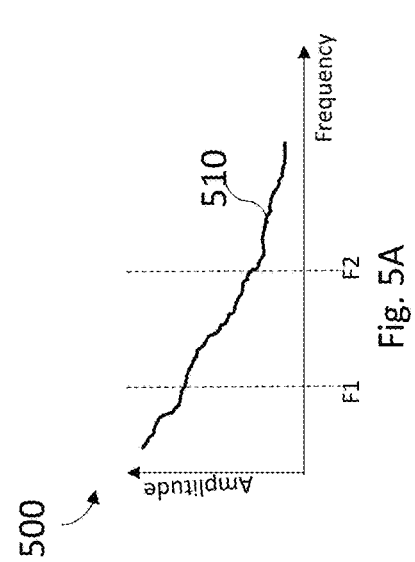
FIG. 5A is a graph of frequency versus amplitude based on detected backscatter light data in accordance with some embodiments.

FIG. 5A is a graph 500 of frequency versus amplitude based on detected backscatter light data in accordance with some embodiments. In some embodiments, the graph 500 is generated using a Fourier transform on the information collected in the backscatter light data. Graph 500 includes a plot 510. Small variations in the plot 510 indicate minor vibration variations at different frequencies. A first frequency F1 is a frequency at which a vehicle is likely to induce vibration of the optical fiber. In some embodiments, the first frequency F1 is at about 50 Hertz (Hz). A second frequency F2 is a frequency at which removal of a maintenance hatch is likely to induce vibration of the optical fiber. In some embodiments, the second frequency F2 is at about 70 Hz. In some embodiments, removal of different maintenance hatches results in generation of different frequencies. A frequency generated by removal of a maintenance hatch depends on a material of the maintenance hatch, a type of mounting of the maintenance hatch in an opening, a size of the maintenance hatch and a shape of the maintenance hatch. By using a trained model in combination with information related to a type of maintenance hatch at different locations along the optical fiber accurate detection of removal of the maintenance hatch is improved. The plot 510 does not include a noticeable peak at either the first frequency F1 or the second frequency F2. This is an indication of a normal state. In some embodiments, in response to generation of a plot such as plot 510 monitoring apparatus 111 (FIG. 1) or data analysis device 260 (FIG. 2) will determine that the optical fiber is at a normal condition.

FIG. 5B is a graph 500' of frequency versus amplitude based on detected backscatter light data in accordance with some embodiments. In some embodiments, the graph 500' is generated using a Fourier transform on the information collected in the backscatter light data. Graph 500' includes a plot 510'. In comparison with the plot 510 (FIG. 5A), the plot 510' includes a peak at the first frequency F1. The peak at the first frequency F1 indicates a passing of a vehicle. The peak at the first frequency is not indicative of removal of the maintenance hatch. Therefore, the plot 510' would indicate a normal state. In some embodiments, in response to generation of a plot such as plot 510' monitoring apparatus 111 (FIG. 1) or data analysis device 260 (FIG. 2) will determine that the optical fiber is at a normal condition.

FIG. 5C is a graph 500" of frequency versus amplitude based on detected backscatter light data in accordance with some embodiments. In some embodiments, the graph 500" is generated using a Fourier transform on the information collected in the backscatter light data. Graph 500" includes a plot 510". In comparison with the plot 510 (FIG. 5A), the plot 510" includes a peak at the second frequency F2. The peak at the second frequency F2 indicates removal of a maintenance hatch. Therefore, the plot 510" would indicate an abnormal state. In some embodiments, in response to generation of a plot such as plot 510" monitoring apparatus 111 (FIG. 1) or data analysis device 260 (FIG. 2) will determine that the optical fiber is at an abnormal condition.

By combining timing backscatter light data, such as graph 400 (FIG. 4), with an abnormal state detection, such as graph 510" (FIG. 5C), both a timing and a location of removal of the maintenance hatch is able to be determined. This combination of information helps with fast response for replacement of removed maintenance hatches as well as an increased opportunity to identify theft of the maintenance hatch.

FIG. 6A is a view of an arrangement 600 of a maintenance hatch 630 covering an opening 640 over optical fiber 620 in accordance with some embodiments. Arrangement 600 includes maintenance hatch 630 over opening 640 in a ground 610. In some embodiments, opening 640 is in a sewer or other utility conduit. The optical fiber 620 is below the maintenance hatch 640 and protected from an environment on an opposite side of the maintenance hatch 640 by the maintenance hatch 640. A sound wave 650 from the environment on the opposite side of the maintenance hatch is generated by a sound source (not shown). The maintenance hatch 640 reflects or redirects a significant portion of the sound wave 650, as seen in the arrangement 600. As a result, a minimal amount (or none) of the sound wave 650 is incident on the optical fiber 620.

FIG. 6B is a graph 660 of intensity versus distance resulting from the arrangement of FIG. 6A in accordance with some embodiments. Graph 660 includes plot 670. The plot 670 indicates minor variations in intensity of sound waves incident along the optical fiber 620. The variations in intensity of sound waves along the optical fiber 620 are all below an intensity threshold Ith. The intensity of the sound wave incident on the optical fiber 620 will depend on a depth of the optical fiber 620, a size of the opening 640, a material of the ground 610 and a shape and orientation of the opening 640. In some embodiments, the user utilizes these factors to set the intensity threshold Ith. In some embodiments, a processor, e.g., monitoring apparatus 111 (FIG. 1) or data analysis device 260 (FIG. 2), utilizes these factors to determine the intensity threshold Ith. This indicates a normal condition for the maintenance hatch 630. Graph 660 includes a first distance D1 indicating a location of the maintenance hatch 630 along the optical fiber 620. Graph 660 further includes a second distance D2 indicating a location of a second maintenance hatch (not shown) along optical fiber 620. The distances D1 and D2 are distance from a sensor, e.g., sensor 112 (FIG. 1) or sensor 250 (FIG. 2). The plot 670 indicates that both maintenance hatch 630 at distance D1 and the second maintenance hatch at distance D2 are in a normal condition.

FIG. 7A is a view of an arrangement 700 of an opening 740 over optical fiber 720 without a maintenance cover in accordance with some embodiments. In comparison with arrangement 600, arrangement 700 does not include a maintenance hatch, i.e., the maintenance hatch has been removed, over opening 740 in a ground 710. In some embodiments, opening 740 is in a sewer or other utility conduit. The optical fiber 720 is below the maintenance hatch 740 but exposed to an environment outside of the opening 740. Sound waves 750 from the environment outside of the opening is able to propagate through the opening 740 to be incident on the optical fiber 720.

FIG. 7B is a graph 760 of intensity versus distance resulting from the arrangement of FIG. 7A in accordance with some embodiments. Graph 760 includes plot 770. In comparison with plot 670, plot 770 includes an intensity spike at distance D1 indicating that sound waves 750 are not blocked by a maintenance hatch. The intensity peak at distance D1 exceeds the intensity threshold Ith. Thus, the plot 770 indicates that the maintenance hatch at distance D1 has been removed. Similar to plot 670, the plot 770 does not include a peak at distance D2. Thus, the plot 770 indicates that the maintenance hatch at distance D2 remains over the optical fiber 720. The plot 770 indicates that the maintenance hatch at distance D1 is in an abnormal state and the maintenance hatch at distance D2 is in a normal condition.

Figure 8A:
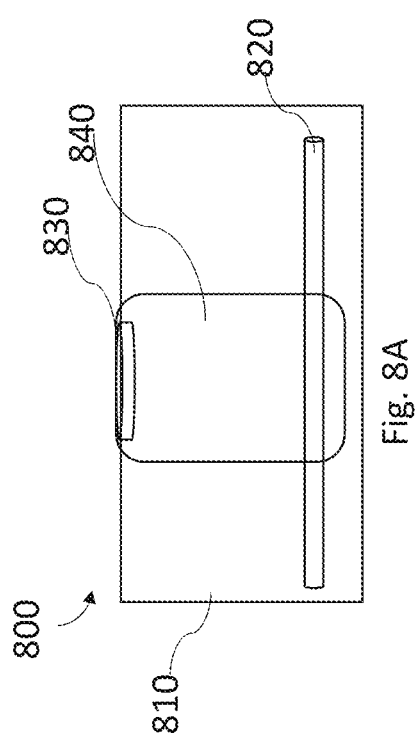
FIG. 8A is a view of an arrangement of a buried optical fiber including an opening covered by a maintenance hatch in accordance with some embodiments.

FIG. 8A is a view of an arrangement 800 of a buried optical fiber 820 including an opening 840 covered by a maintenance hatch 830 in accordance with some embodiments. Arrangement 800 includes maintenance hatch 830 over opening 840 in a ground 810. In some embodiments, opening 840 is in a sewer or other utility conduit. The optical fiber 820 is below the maintenance hatch 840 and protected from an environment on an opposite side of the maintenance hatch 840 by the maintenance hatch 840. Portions of optical fiber 820 that are buried in the ground 810 or in a conduit buried in the ground 810 will have a substantially uniform temperature throughout both the day and night due to the substantially uniform temperature of the ground 810. In contrast, a portion of the optical fiber 820 within opening 840 will exhibit a fluctuation in temperature due to variations in the air temperature. For example, a temperature during the day is typically higher than a temperature at night. Therefore, the portion of the optical fiber 820 in the opening 840 would be expected to exhibit a temperature fluctuation from the day to the night. When maintenance hatch 830 is over opening 840 a magnitude of the temperature fluctuation of the portion of the optical fiber 820 in the opening 840 is reduced in comparison to an exposed optical fiber because heat is reflected by the maintenance hatch 830 during the day; and the maintenance hatch 830 insulates the opening 840 during the night.

Figure 8B:
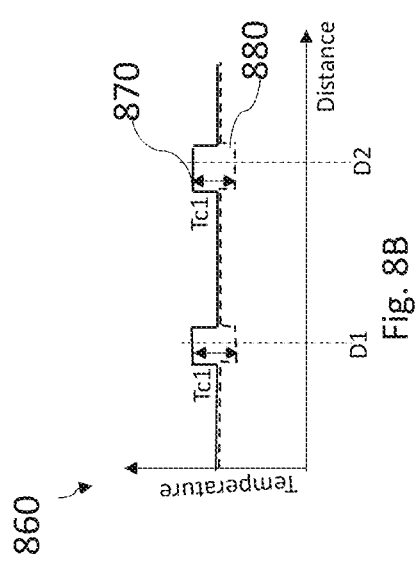
FIG. 8B is a graph of temperature versus distance resulting from the arrangement of FIG. 8A in accordance with some embodiments.

FIG. 8B is a graph 860 of temperature versus intensity resulting from the arrangement of FIG. 8A in accordance with some embodiments. Graph 860 includes plot 870 for a temperature measured during the day and a plot 880 for a temperature measured during the night. Both the plot 870 and the plot 880 indicates that portions of the optical fiber 820 buried in the ground 810 maintain substantially uniform temperature during both the day and the night. Graph 860 includes a first distance D1 indicating a location of the maintenance hatch 830 along the optical fiber 820. Graph 860 further includes a second distance D2 indicating a location of a second maintenance hatch (not shown) along optical fiber 820. The distances D1 and D2 are distance from a sensor, e.g., sensor 112 (FIG. 1) or sensor 250 (FIG. 2). The plot 870 indicates that both the portion of the optical fiber 820 under the maintenance hatch 630 at distance D1 and the portion of the optical fiber 820 under the second maintenance hatch at distance D2 have a higher temperature than portions of the optical fiber 820 buried in the ground 810 during the day. The plot 880 indicates that both the portion of the optical fiber 820 under the maintenance hatch 630 at distance D1 and the portion of the optical fiber 820 under the second maintenance hatch at distance D2 have a lower temperature than portions of the optical fiber 820 buried in the ground 810 during the night. The temperature change between the plot 870 and the plot 880 at both the first distance D1 and the second distance D2 is a first temperature change Tc1. The temperature change of the optical fiber 620 will depend on a depth of the optical fiber 820, a size of the opening 840, a material of the ground 810 and a shape and orientation of the opening 840. In some embodiments, the user utilizes these factors to determine a temperature change threshold range to determine whether the temperature change is within an expected range. In some embodiments, a processor, e.g., monitoring apparatus 111 (FIG. 1) or data analysis device 260 (FIG. 2), utilizes these factors to determine a temperature change threshold range to determine whether the temperature change is within an expected range. In some embodiments, recorded weather conditions from an external device are used to determine the temperature change threshold range. That is, the temperature change threshold range varies, in some embodiments, depending on the recorded weather conditions in the location of the maintenance hatch 830. The temperature change Tc1 indicates a normal condition for the maintenance hatch 830.

FIG. 9A is a view of an arrangement 900 of a buried optical fiber 920 including an opening 940 without a maintenance hatch in accordance with some embodiments. In comparison with arrangement 800, arrangement 900 does not include a maintenance hatch, i.e., the maintenance hatch has been removed, over opening 940 in a ground 910. In some embodiments, opening 940 is in a sewer or other utility conduit. The optical fiber 920 is below the maintenance hatch 740 but exposed to an environment outside of the opening 940. The portions of the optical fiber 920 in the opening 940 are exposed to the outside environment. There is no reflection of heat by the maintenance hatch or insulation of the optical fiber 920 by the maintenance hatch. As a result, temperature fluctuation of the optical fiber 920 within the opening is different from a situation where the maintenance hatch is over the opening 940, as in the arrangement 800. For example, when the opening 940 is dry a temperature change from the day to the night will have a higher magnitude in comparison with the arrangement 800, in some instances. When the portions of the optical fiber 920 in the opening 940 are covered with water, the temperature change of the portions of the optical fiber 920 will be reduced due to the water maintaining a substantially constant temperature due to the surrounding ground temperature. This is an indication that the portions of the optical fiber 920 are exposed to rain due to the removal of the maintenance hatch. When the portions of the optical fiber 920 in the opening 940 are covered with snow or ice, the temperature change of the portions of the optical fiber 920 will also be reduced due to the snow or ice. This is an indication that the portions of the optical fiber 920 are exposed to snow due to the removal of the maintenance hatch.

FIG. 9B is a graph 960 of temperature versus distance resulting from the arrangement of FIG. 9A in accordance with some embodiments. Graph 960 indicates a situation where the opening 940 is dry. Graph 960 includes plot 970 for a temperature measured during the day and a plot 980 for a temperature measured during the night. Both the plot 970 and the plot 980 indicate that portions of the optical fiber 920 buried in the ground 910 maintain substantially uniform temperature during both the day and the night. In comparison with graph 860, graph 960 includes a second temperature change Tc2 that is larger than the first temperature change Tc1 at distance D1 indicating that portions of the optical fiber 920 are not protected by a maintenance hatch. The second temperature change Tc2 at distance D1 is outside of the temperature change threshold range. Thus, the graph 960 indicates that the maintenance hatch at distance D1 has been removed. Similar to graph 860, the graph 960 has the first temperature change Tc1 at distance D2. Thus, the graph 960 indicates that the maintenance hatch at distance D2 remains over the optical fiber 920. The graph 960 indicates that the maintenance hatch at distance D1 is in an abnormal state and the maintenance hatch at distance D2 is in a normal condition.

FIG. 9C is a graph 960' of temperature versus distance resulting from the arrangement of FIG. 9A in accordance with some embodiments. Graph 960' indicates a situation where the portions of the optical fiber 920 in the opening 940 are covered with water. Graph 960' includes plot 970' for a temperature measured during the day and a plot 980' for a temperature measured during the night. Both the plot 970' and the plot 980' indicate that portions of the optical fiber 920 buried in the ground 910 maintain substantially uniform temperature during both the day and the night. In comparison with graph 860, graph 960' includes a third temperature change Tc3 that is smaller than the first temperature change Tc1 at distance D1 indicating that portions of the optical fiber 920 are not protected by a maintenance hatch and that water is covering the optical fiber 920. The temperature of the optical fiber 920 in the opening 940 being greater than the buried portions of the optical fiber 920 indicate that water surrounds the optical fiber 920. The third temperature change Tc3 at distance D1 is outside the temperature change threshold range. Thus, the graph 960' indicates that the maintenance hatch at distance D1 has been removed. Similar to graph 860, the graph 960' has the first temperature change Tc1 at distance D2. Thus, the graph 960' indicates that the maintenance hatch at distance D2 remains over the optical fiber 920. The graph 960' indicates that the maintenance hatch at distance D1 is in an abnormal state and the maintenance hatch at distance D2 is in a normal condition.

FIG. 9D is a graph 960" of temperature versus distance resulting from the arrangement of FIG. 9A in accordance with some embodiments. Graph 960" indicates a situation where the portions of the optical fiber 920 in the opening 940 are covered with snow or ice. Graph 960" includes plot 970" for a temperature measured during the day and a plot 980" for a temperature measured during the night. Both the plot 970" and the plot 980" indicate that portions of the optical fiber 920 buried in the ground 910 maintain substantially uniform temperature during both the day and the night. In comparison with graph 860, graph 960″ includes a fourth temperature change Tc4 that is smaller than the first temperature change Tc1 at distance D1 indicating that portions of the optical fiber 920 are not protected by a maintenance hatch and that snow or ice is covering the optical fiber 920. The temperature of the optical fiber 920 in the opening 940 being less than the buried portions of the optical fiber 920 indicate that snow or ice surrounds the optical fiber 920. The fourth temperature change Tc4 at distance D1 is outside the temperature change threshold range. Thus, the graph 960″ indicates that the maintenance hatch at distance D1 has been removed. Similar to graph 860, the graph 960″ has the first temperature change Tc1 at distance D2. Thus, the graph 960″ indicates that the maintenance hatch at distance D2 remains over the optical fiber 920. The graph 960″ indicates that the maintenance hatch at distance D1 is in an abnormal state and the maintenance hatch at distance D2 is in a normal condition.

Figure 10:
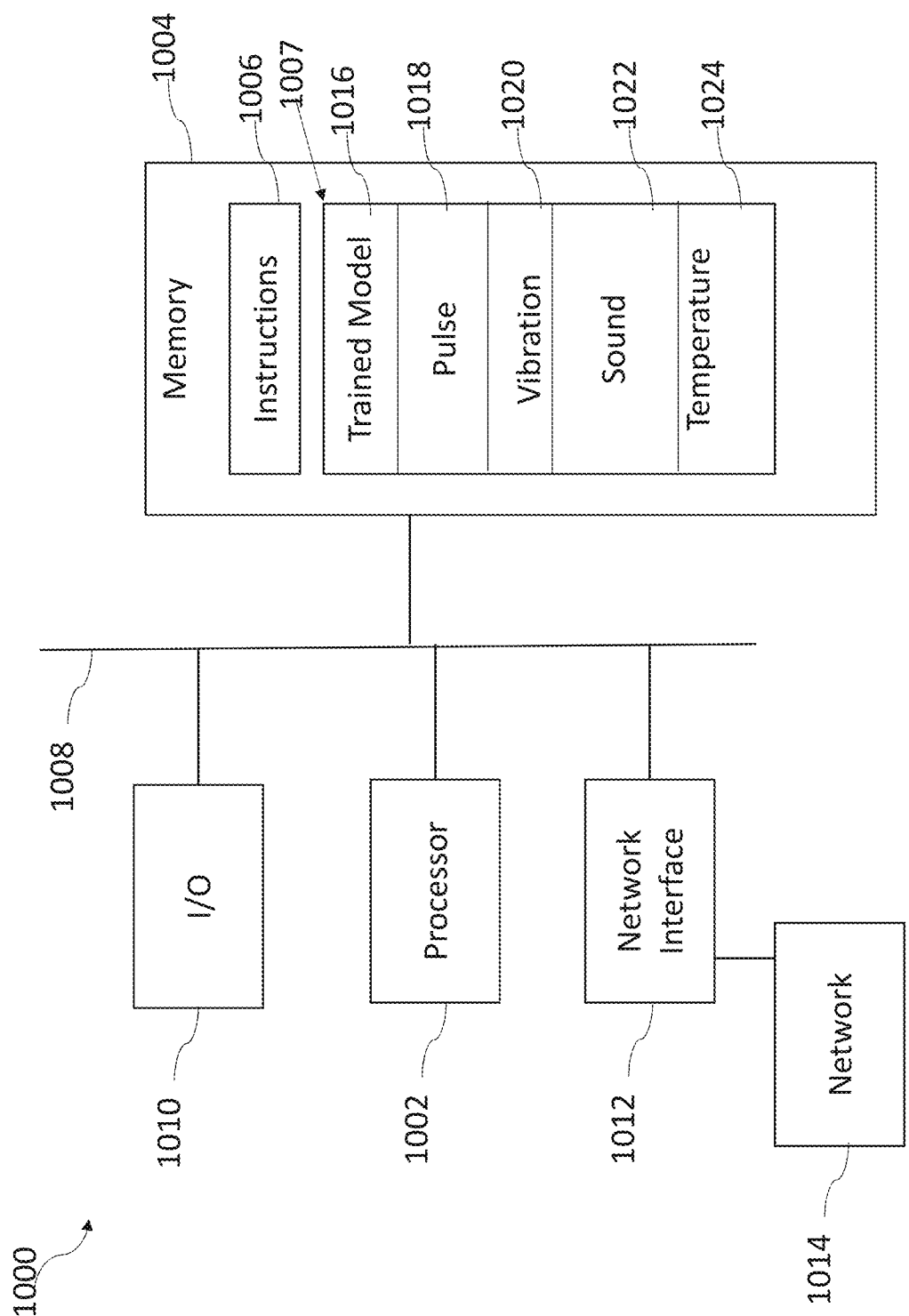
FIG. 10 is a schematic diagram of a system for identifying removal of a maintenance hatch in accordance with some embodiments.

FIG. 10 is a block diagram of a system 1000 for determining whether a maintenance hatch is removed in accordance with some embodiments. In some embodiments, the monitoring apparatus 111 (FIG. 1) or the data analysis device (260) is implemented using system 1000. System 1000 includes a hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with external devices. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause system 100 to be usable for performing a portion or all of the operations as described in method 300.

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the storage medium 1004 stores the computer program code 1006 configured to cause system 1000 to perform method 300. In some embodiments, the storage medium 1004 also stores information needed for performing a method 300 as well as information generated during performing the method 300, such as a trained model parameter 1016, a pulse parameter 1018, a vibration parameter 1020, a sound parameter 1022, a temperature parameter 1024 and/or a set of executable instructions to perform the operation of method 300.

In some embodiments, the storage medium 1004 stores instructions 1007 for interfacing with external devices. The instructions 1007 enable processor 1002 to generate instructions readable by the external devices to effectively implement method 300.

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 100 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-1394. In some embodiments, method 300 is implemented in two or more systems 1000, and information such as sensor data, are exchanged between different systems 1000 via network 1014.

System 1000 is configured to receive information related to a trained model through I/O interface 1010 or network interface 1012. The trained model is transferred to processor 1002 via bus 1008 then stored in computer readable medium 1004 as trained model parameter 1016. In some embodiments, system 100 is configured to receive information related to pulse information through I/O interface 1010 or network interface 1012. In some embodiments, the processor 1002 is configured to store the information in computer readable medium 1004 as pulse parameter 1018. In some embodiments, system 1000 is configured to receive information related to detected vibrations through I/O interface 1010 or network interface 1012. In some embodiments, the processor 1002 is configured to generate information related to vibrations based on backscatter light data received from sensor, e.g., sensor 112 (FIG. 1) or sensor 250 (FIG. 2). The vibration information is stored in computer readable medium 1004 as vibration parameter 1020. In some embodiments, system 1000 is configured to receive information related to detected sound through I/O interface 1010 or network interface 1012. In some embodiments, the processor 1002 is configured to generate information related to sound based on backscatter light data received from sensor, e.g., sensor 112 (FIG. 1) or sensor 250 (FIG. 2). The sound information is stored in computer readable medium 1004 as sound parameter 1022. In some embodiments, system 1000 is configured to receive information related to detected temperature through I/O interface 1010 or network interface 1012. In some embodiments, the processor 1002 is configured to generate information related to temperature based on backscatter light data received from sensor, e.g., sensor 112 (FIG. 1) or sensor 250 (FIG. 2). The temperature information is stored in computer readable medium 1004 as temperature parameter 1024.

(Supplemental Note 1)

A method of detecting removal of a maintenance hatch. The method includes transmitting an optical pulse along an optical fiber, wherein a first portion of the optical fiber is proximate to the maintenance hatch. The method further includes detecting backscatter light from the optical fiber using a sensor. The method further includes determining information related to the first portion of the optical fiber based on a comparison of the detected backscatter light and a trained model. The method further includes identifying whether the maintenance hatch has been removed based on the determined information.

(Supplemental Note 2)

In some embodiments, the method further includes determining a distance of the first portion from the sensor based on the detected backscatter light.

(Supplemental Note 3)

In some embodiments, determining the information includes determining whether a vibration frequency of the first portion has a peak at a selected frequency.

(Supplemental Note 4)

In some embodiments, the method further includes determining the selected frequency based on a material of the maintenance hatch.

(Supplemental Note 5)

In some embodiments, determining the information includes determining an intensity of sound waves incident on the first portion of the optical fiber.

(Supplemental Note 6)

In some embodiments, determining the information includes determining a temperature of the first portion of the optical fiber.

(Supplemental Note 7)

In some embodiments, the method includes determining a timing of removal of the maintenance hatch in response to the determined information indicating that the first portion of the optical fiber is in an abnormal condition.

(Supplemental Note 8)

In some embodiments, the method further includes alerting a user of the abnormal condition in response to the determined information indicating that the first portion of the optical fiber is in an abnormal condition.

(Supplemental Note 9)

In some embodiments, alerting the user of the abnormal condition includes displaying an image of an area including a location of the first portion of the optical fiber.

(Supplemental Note 10)

In some embodiments, the method further includes reporting a normal state to a user in response to the determined information indicating that the first portion of the optical fiber is in a normal condition.

(Supplemental Note 11)

In some embodiments, the method further includes inspecting an area including a location of the first portion of the optical fiber in response to the determined information indicating that the first portion of the optical fiber is in an abnormal condition; and reporting a false positive in response to a determination that the maintenance hatch is present proximate to the first portion of the optical fiber.

(Supplemental Note 12)

In some embodiments, the method further includes determining second information related to a second portion of the optical fiber based on the detected backscatter light, wherein the second portion of the optical fiber is proximate a second maintenance hatch; and identifying whether the second maintenance hatch has been removed based on the determined second information.

(Supplemental Note 13)

A system for detecting removal of a maintenance hatch. The system includes a non-transitory computer readable medium configured to store instructions thereon. The system further includes a sensor configured to detect backscatter light data from an optical fiber, wherein a first portion of the optical fiber is proximate the maintenance hatch. The system further includes a processor connected to the sensor and the non-transitory computer readable medium. The processor is configured to execute the instructions for receiving the detected backscatter light data; determining information related to the first portion of the optical fiber based on a comparison of the detected backscatter light data and a trained model; and identifying the maintenance hatch as removed in response to the comparison indicating that the first portion of the optical fiber is in an abnormal condition.

(Supplemental Note 14)

In some embodiments, the processor is configured to execute the instructions for determining a distance of the first portion from the sensor based on the detected backscatter light data.

(Supplemental Note 15)

In some embodiments, the processor is configured to execute the instructions for determining the information by determining whether a vibration frequency of the first portion has a peak at a selected frequency.

(Supplemental Note 16)

In some embodiments, the processor is configured to execute the instructions for determining the selected frequency based on a material of the maintenance hatch.

(Supplemental Note 17)

In some embodiments, the processor is configured to execute the instructions for determining the information by determining an intensity of sound waves incident on the first portion of the optical fiber.

(Supplemental Note 18)

In some embodiments, the processor is configured to execute the instructions for determining the information by determining a temperature of the first portion of the optical fiber.

(Supplemental Note 19)

In some embodiments, the processor is configured to execute the instructions for determining a timing of removal of the maintenance hatch in response to the comparison indicating that the first portion of the optical fiber is in the abnormal condition.

(Supplemental Note 20)

A non-transitory computer readable medium configured to store instructions thereon that when executed by a processor cause the processor to receiving backscatter light data based on backscatter light detected from an optical fiber having a first portion adjacent to a maintenance hatch; determine information related to the first portion of the optical fiber based on a comparison of the received backscatter light data and a trained model; and identify the maintenance hatch as removed in response to the comparison indicating that the first portion of the optical fiber is in an abnormal condition.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of detecting removal of a maintenance hatch, the method comprising:
   transmitting an optical pulse along an optical fiber, wherein a first portion of the optical fiber is proximate to the maintenance hatch;
   detecting backscatter light from the optical fiber using a sensor;

determining vibration information related to the first portion of the optical fiber based on a comparison of the detected backscatter light and a trained model; and identifying whether the maintenance hatch has been removed based on the determined vibration information, wherein determining the vibration information comprises determining whether a vibration frequency of the first portion has a peak at a selected frequency.

2. The method according to claim 1, further comprising determining a distance of the first portion from the sensor based on the detected backscatter light.

3. The method according to claim 1, further comprising determining the selected frequency based on a material of the maintenance hatch.

4. The method according to claim 1, further comprising determining a timing of removal of the maintenance hatch in response to the determined vibration information indicating that the first portion of the optical fiber is in an abnormal condition.

5. The method according to claim 1, further comprising alerting a user of the removed maintenance hatch in response to the determined vibration information indicating that the first portion of the optical fiber is in an abnormal condition.

6. The method according to claim 5, wherein alerting the user comprises displaying an image of an area including a location of the first portion of the optical fiber.

7. The method according to claim 1, further comprising reporting a normal state to a user in response to the determined vibration information indicating that the first portion of the optical fiber is in a normal condition.

8. The method according to claim 1, further comprising:
inspecting an area including a location of the first portion of the optical fiber in response to the determined vibration information indicating that the first portion of the optical fiber is in an abnormal condition; and
reporting a false positive in response to a determination that the maintenance hatch is present proximate to the first portion of the optical fiber.

9. The method according to claim 1, further comprising:
determining second information related to a second portion of the optical fiber based on the detected backscatter light, wherein the second portion of the optical fiber is proximate a second maintenance hatch; and
identifying whether the second maintenance hatch has been removed based on the determined second information.

10. A system for detecting removal of a maintenance hatch, the system comprising:
a non-transitory computer readable medium configured to store instructions thereon;
a sensor configured to detect backscatter light data from an optical fiber, wherein a first portion of the optical fiber is proximate to the maintenance hatch; and
a processor connected to the sensor and the non-transitory computer readable medium, wherein the processor is configured to execute the instructions for:
receiving the detected backscatter light data;
determining vibration information related to the first portion of the optical fiber based on a comparison of the detected backscatter light data with a trained model; and
identifying the maintenance hatch as removed in response to the comparison indicating that the first portion of the optical fiber is in an abnormal condition,
determining the vibration information by determining whether a vibration frequency of the first portion has a peak at a selected frequency.

11. The system according to claim 10, wherein the processor is configured to execute the instructions for determining a distance of the first portion from the sensor based on the detected backscatter light data.

12. The system according to claim 10, wherein the processor is configured to execute the instructions for determining the selected frequency based on a material of the maintenance hatch.

13. The system according to claim 10, wherein the processor is configured to execute the instructions for determining a timing of removal of the maintenance hatch in response to the comparison indicating that the first portion of the optical fiber is in the abnormal condition.

14. A non-transitory computer readable medium configured to store instructions thereon that when executed by a processor cause the processor to:
receive backscatter light data based on backscatter light detected from an optical fiber having a first portion adjacent to a maintenance hatch;
determine vibration information related to the first portion of the optical fiber based on a comparison of the received backscatter light data and a trained model, wherein the vibration information is determined by determining whether a vibration frequency of the first portion has a peak at a selected frequency; and
identify the maintenance hatch as removed in response to the comparison indicating that the first portion of the optical fiber is in an abnormal condition.

* * * * *